Figure 1:
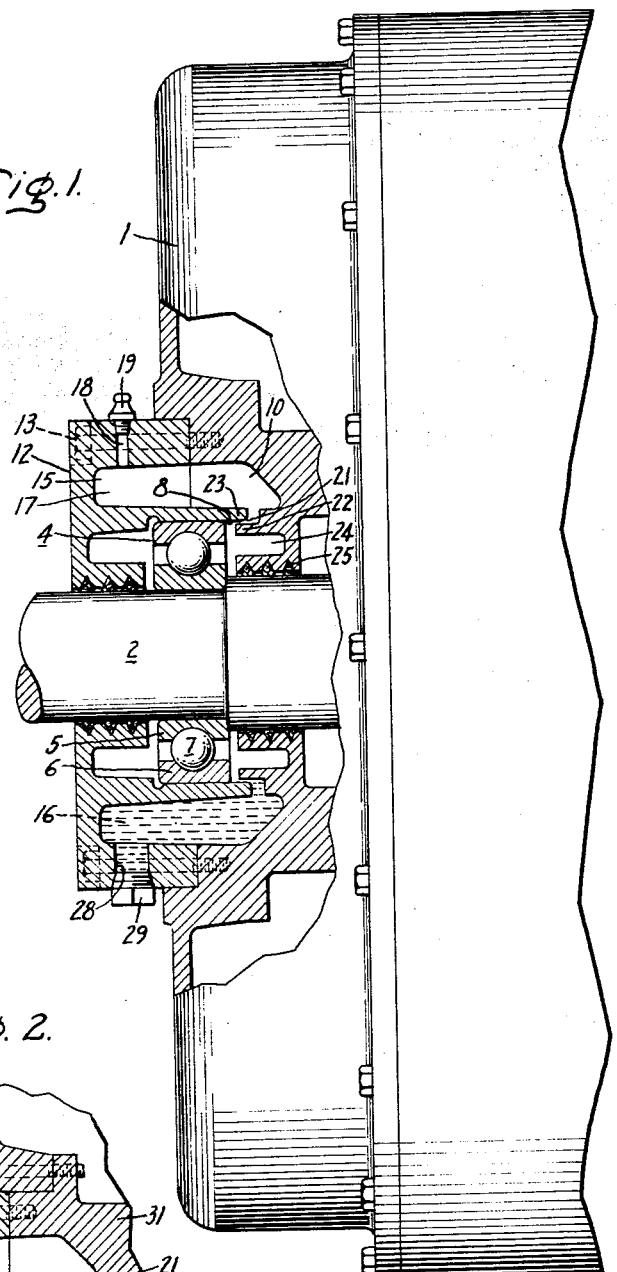

Jan. 19, 1960

J. W. REARDON 2,921,821

ANTIFRICTION BEARING LUBRICATOR

Filed Nov. 13, 1957

Inventor:
John W. Reardon,
by David P. Ogden
His Attorney.

United States Patent Office 2,921,821
Patented Jan. 19, 1960

2,921,821

ANTIFRICTION BEARING LUBRICATOR

John W. Reardon, Erie, Pa., assignor to General Electric Company, a corporation of New York Application November 13, 1957, Serial No. 696,216

2 Claims. (Cl. 308—187)

My invention relates to an antifriction bearing lubricator and, more particularly, to a grease cavity surrounding and hydraulically connected to antifriction bearings.

For some time, it has been the accepted practice to protect from oxidation and lubricate antifriction bearings on high speed rotating equipment such as dynamoelectric machines with an oil coating. It is well known that an oil coating of microscopic thickness is sufficient to protect such bearings. However, oil must be added periodically to maintain a complete coverage of the rolling surfaces. In order to reduce maintenance costs, a source of oil is often provided adjacent to the rolling surfaces.

Lubricating with an oil supply contained in the bearing reservoir results in excessive leakage if the machine is mounted in an unusual manner or in a completed apparatus such as an airplane or boat which is likely to be tilted during operation. Therefore, grease is most often used. Improper greasing practice whereby excessive amounts of grease are introduced directly into the bearing cavity may cause abnormal heating to reduce sharply the life of the bearing. Too much grease causes churning of the grease and excessive heating resulting in destruction of the grease. Infrequent greasing may be equally destructive because the grease will tend to dry out and thus supply an insufficient amount of oil. Obviously, the practice of frequent cleaning and regreasing of a bearing is prohibitively expensive.

Therefore, an object of my invention is to provide a simple and reliable bearing lubricator wherein grease is stored adjacent to but not in contact with the bearing whereby the probability of damage caused by improper maintenance is reduced.

Briefly, in one embodiment of my invention, a grease cavity surrounds the outer raceway of a ball bearing. Oil drainage from the grease will seep to the bearing through an orifice which is designed to inhibit the passage of any grease therethrough to contact directly the surface of the balls. The cavity is provided with an exhaust port substantially larger than the inlet which is opened during greasing to allow the new grease under low pressure to force out the old partially dried grease. This open port prevents purging pressures within the cavity building up sufficiently to force grease through the seepage orifice.

Figure 2:
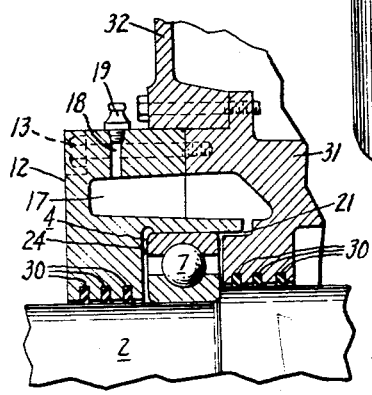

The subject matter which I regard as my invention is particularly pointed out and distinctly claimed in the concluding portion of this specification. My invention, however, as to its organization and method of operation together with further objects and advantages thereof will best be understood by reference to the following description taken in connection with the accompanying drawing, in which:

Fig. 1 shows a cut-away view partially in section of a bearing housing embodying my invention; and Fig. 2 shows a detail view of another embodiment of my invention.

Referring now to the drawing, in which like numbers refer to similar parts, in Fig. 1, I have shown a housing 1 of a dynamoelectric machine for supporting a rotatable shaft 2 therein by means of a ball bearing arrangement 4 having an inner race 5, secured to the rotatable shaft 2, and outer race 6 and balls 7. The outer race 6 is mounted within a non-rotatable surface 8 secured to the housing 1. The housing 1 is provided with an annular recess 10 which surrounds the region of the shaft and is adjacent to but not contacting the ball bearing 4. A removable cover 12 is secured to the housing 1 to form a part thereof by a plurality of bolts 13 so that a recess 15 therein mates with the recess 10. When assembled as shown, grease 16 may be admitted to and maintained in a cavity 17 formed by the mating recesses 10 and 15 through an inlet 18 which is generally covered by a cap 19 to prevent undesirable entrance of dirt or contaminants. It should be noted that the cavity 17 does not have any surface engaging directly a rotatable member such as the inner race 5 or the shaft 2.

It is well known that grease is composed of a relatively inactive soap-like compound which contains a liquid lubricant. When grease is allowed to stand for a period of time, the lubricant compound or oil, as it is generally referred to, will separate slowly from the soap-like compound, and this oil seepage may be used to perform the necessary lubrication of bearings adjacent to the supply of grease. By proper choice of the compound base, such as lithium or sodium soaps, I am able to determine the rate of bleeding in the range of approximately 1 to 20 drops of oil per week, depending primarily on the particular bearing requirements. Thus, depending on the maintenance practices of a particular art, I will fill a smaller cavity 17 with a freely bleeding grease which must be purged often or fill a larger cavity 17 with a slower bleeding grease to provide the proper lubrication for extended periods. In any event, the cavity capacity should be sufficient to provide the required oil and to allow an acceptable maintenance procedure.

According to my invention, the cavity 17 is connected by an annular orifice 21 to the region of the bearing 4. Through this orifice 21 a minute quantity of oil separated from the grease will seep continuously to maintain a protective miscroscopic oil coating on the entire surface of the balls 7. This coating will minimize friction, prevent erosion of the balls and races of the bearing under operating conditions and prevent any oxidation of these parts. It should be noted that most greases will bleed more freely as they are heated, thus, any frictional heat will tend to release additional oil to increase the supply of oil in the bearing.

The orifice 21, according to the modification shown in Fig. 1, is formed between one surface of an annular detent, or sleeve 22, extending axially outward from the housing 1 and a surface of a similar annular sleeve 23 extending axially inward from the cover 12. Between these annular overlapping sleeves 22 and 23 is the annular orifice 21 which is of a capillary size, such as two thousandths of an inch, to allow the oil separated from the grease to enter the bearing cavity 24 and lubricate the bearing 4. According to my invention, the size of the orifice 21 is critical because it must inhibit entrance of an appreciable amount of grease into the bearing cavity 4. We have found that the minimum spacing of the orifice 21 depends on the particular oil within the grease. Moreover, the maximum allowable radial spacing depends on both the type of grease and the maximum pressure of the grease 16 within the cavity 17. For very light oil, a minimum dimension of the orifice which will permit proper seepage would be approximately five ten-thousandths (.0005") of an inch, however, for most oils, a minimum dimension which will permit proper seepage is one thousandth (.001") of an inch. With the very low greasing pressures contemplated, most greases will not flow through an orifice of ten thousandths (.01") of an inch. Thus, it is obvious that the critical spacing limitations in terms of number of thousandths of an inch, of the orifice will depend on the oil, the grease, and the maintenance practice.

From time to time it will occur that the seepage of oil from the grease 16 in the cavity 17 will cause the remaining grease to be partially dried. Obviously, the amount of oil seeping from partially dried grease will be reduced according to the amount of drying. This reduction of oil seepage will, at some time, reach a point where insufficient oil is maintained on the bearing 4. In order to prevent destruction of the bearing because of such a condition, it will be necessary to replenish or replace the grease by periodic maintenance. However, replenishing the grease 16 without replacing or removing the dried grease would tend to oversupply grease in the cavity 17 whereby pressure would be increased. I contemplate that sufficient pressure of this type would force grease through the orifice 21 into the bearing cavity 24.

In order to prevent this forcing of grease into the bearing cavity 24 during maintenance, I have provided an exhaust port 28 at the bottom of the cover 12. Thus, when it is desired to replenish or purge the grease, the cap 19 is removed to open the inlet 18 and a cap 29 is removed to open the port 28. I prefer to have the exhaust port 28 substantially larger than the inlet 18. This will compensate for the probability that the used grease passing through the port 28 will be drier and more viscous than the new grease being admitted at the inlet 18. This arrangement assures the purging of the dried grease with a minimum of pressure equal or equivalent to the normal pressure used in admitting grease through the inlet 18. I prefer to have the relative cross sections of the inlet 18 and the port 28 of a ratio of approximately 1:9 respectively.

Contaminants within the bearing cavity will damage the bearing 4. An oiled bearing such as this will not usually be self-sealing along the shaft. On the other hand, a greased bearing provides excess grease which tends to flow from the grease filled bearing cavity through the running fit between the shaft and the housing parts to purge dirt from or at least prevent admission of dirt to the bearing cavity. According to my invention, I prefer not to have sufficient grease in the bearing cavity 24 to accomplish this cleaning action. Thus, the grease 16 will not be depleted by flow along the running fit. Therefore, in order to prevent the admission of dirt to the bearing cavity 24, I have provided annular seals in both the housing 1 and the cover 12 surrounding the rotatable shaft 2. In Fig. 1, I show the seal grooves 25 as being filled with a hydraulic insulation such as fibrous sealing grease. Moreover, this fibrous grease will prevent the entrance of moisture into the bearing cavity 24 and thus inhibit rust formation. The details of the particular seal are not important to this invention, and several of the known rubbing seals will provide the desired hydraulic insulation.

Referring now to Fig. 2 where I have shown a similar grease cavity 17 and cover 12, the bearing cavity 24 is considerably reduced in volume. Such a reduction is possible only with my invention where grease is stored adjacent to the bearing cavity 24. Also in Fig. 2, I have shown a plurality of rubber or leather seals 30 surrounding the shafts for preventing the admission of contaminants or dirt. The modification in Fig. 2 illustrates a dynamoelectric machine housing end having two parts 31 and 32 instead of the one piece housing 1 of Fig. 1. Often I find that the two parts 31 and 32 are easier to assemble and maintain than the one piece housing 1.

Because of improper maintenance or overheating of the bearing, there is a possibility of drying or caking of the used grease sufficient to prevent purging, or at least sufficient to cause an increased purging pressure to force new grease through the orifice 21 into the bearing cavity 24. Grease in the bearing cavity 24 is likely to fill it, especially the modification shown in Fig. 2. When there is an excessive amount of grease in the bearing cavity 24, it prevents "channeling" and heating of the grease is likely to occur. Channeling of frictionless bearings refers to the condition where a greased bearing forms a channel or path between walls of grease without there being any grease in the channel between the balls or rollers. Excessive grease in the bearing cavity forces some amount of grease to remain in the channel. When the bearing is rotated, this amount of grease is churned and agitated with the result that it is heated and causes surrounding grease to flow from the channel walls into the channel. Extended operation of a bearing under such conditions will cause much of the grease to be churned and heated. As more grease becomes churned, the cavity gets hotter and soon the grease will start to oxidize and increase further the rotational friction. It is readily apparent that this can and often does damage the bearing.

Therefore, according to my invention, the cover 12 is removable to facilitate cleaning of the recesses 10 and 15 and the bearing cavity 24. As a practical matter, the cover 12 should be removed and cleaned every year or two, or sooner, if at any time purging is very difficult.

While I have shown and described particular modifications of my invention, other modifications will occur to those skilled in the art. For instance, in some applications, it may be inconvenient or unfeasible to have the grease cavity 17 completely surround the bearing 4. Thus, an arcuate or elongated cavity may replace that illustrated in Figs. 1 and 2. The cavity 17 could be located entirely within a housing 1 or the part 31 with the cover 12 a simple flat disc, and the outer race support could be integrally connected to the housing 1. Also, those skilled in the art may find it convenient to replace the annular orifice 18 with one or more capillary holes which will admit oil as it drains from the grease. Although I have shown a ball bearing, I expect my invention to be useful in any type of antifriction bearing. I intend by the appended claims to cover all such modifications as fall within the true spirit and scope of my invention.

What I claim as new and desire to secure by Letters Patent of the United States is:

1. In combination with an antifriction bearing assembly having an inner race, an outer race and bearing members therebetween arranged to have the inner race affixed to a shaft extending through an opening in an end frame member of a high speed machine, a lubrication arrangement for said bearing assembly comprising a cover member having annular recesses therein which provide in cooperation with said end frame member a bearing assembly cavity and a grease cavity, one of said members providing bearing assembly support means between the cavities, there being an opening between the grease cavity and the bearing assembly cavity of a size which enhances conductance of oil from grease within the grease cavity, but which inhibits conductance of grease therethrough.

2. In combination with an antifriction bearing assembly having an inner race, an outer race and bearing members therebetween arranged to have the inner race affixed to a shaft extending through an opening in an end frame member of a high speed machine, a lubrication arrangement for said bearing assembly comprising a cover member having annular recesses therein which provide in cooperation with said end frame member a bearing assembly cavity and a grease cavity, one of said members providing bearing assembly support means between the cavities, there being an opening between the grease cavity and the bearing assembly cavity of a size which enhances conductance of oil from grease within the grease cavity, but which inhibits conductance of grease therethrough, said cover member having grease inlet and exhaust ports therein, the inlet port being positioned near the top thereof, the exhaust port being larger than the inlet port and positioned near the bottom thereof whereby application of new grease to the inlet port readily forces used grease out of the grease cavity through the exhaust port.

References Cited in the file of this patent

UNITED STATES PATENTS

| | | |
|---|---|---|
| 2,164,449 | Delaval-Crow | July 4, 1939 |
| 2,337,403 | Myers et al. | Dec. 21, 1943 |
| 2,449,574 | Wilcock | Sept. 21, 1948 |
| 2,548,644 | Wightman | Apr. 10, 1951 |